US012057053B2

(12) United States Patent
Hu et al.

(10) Patent No.: US 12,057,053 B2
(45) Date of Patent: Aug. 6, 2024

(54) METHOD OF PREVENTING BACKLIGHT MODULE FROM OVERHEATING AND DISPLAY DEVICE

(71) Applicant: TCL CHINA STAR OPTOELECTRONICS TECHNOLOGY CO., LTD., Guangdong (CN)

(72) Inventors: Xiong Hu, Guangdong (CN); Yu Wu, Guangdong (CN); Guangxing Xiao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/280,258

(22) PCT Filed: Mar. 12, 2021

(86) PCT No.: PCT/CN2021/080545
§ 371 (c)(1),
(2) Date: Mar. 26, 2021

(87) PCT Pub. No.: WO2022/178924
PCT Pub. Date: Sep. 1, 2022

(65) Prior Publication Data
US 2024/0021137 A1 Jan. 18, 2024

(30) Foreign Application Priority Data
Feb. 26, 2021 (CN) ......................... 202110216578.0

(51) Int. Cl.
*G09G 3/20* (2006.01)
*G09G 3/32* (2016.01)
*G09G 3/34* (2006.01)

(52) U.S. Cl.
CPC ............. *G09G 3/2096* (2013.01); *G09G 3/32* (2013.01); *G09G 3/342* (2013.01); *G09G 2320/045* (2013.01); *G09G 2320/064* (2013.01)

(58) Field of Classification Search
CPC ........ G09G 3/2096; G09G 3/32; G09G 3/342; G09G 2320/045; G09G 2320/064
See application file for complete search history.

(56) References Cited

U.S. PATENT DOCUMENTS

2009/0021178 A1 1/2009 Furukawa et al.
2009/0289580 A1* 11/2009 Dunn ........................ G09G 3/36 315/307

(Continued)

FOREIGN PATENT DOCUMENTS

CN 1909049 A 2/2007
CN 101377902 A 3/2009

(Continued)

*Primary Examiner* — Kenneth B Lee, Jr.

(57) ABSTRACT

A method of preventing a backlight module from overheating and a display device are provided. The method can prevent backlight partitions from having a long-time high-brightness operation and causing the backlight module to overheat by obtaining a driving current of each backlight partition in the backlight module, judging whether a brightness of each backlight partition in the backlight module exceeds a reference brightness, and adjusting the brightness of each backlight partition that exceeds the reference brightness to a target brightness.

16 Claims, 3 Drawing Sheets

(56) References Cited

U.S. PATENT DOCUMENTS

| | | | | |
|---|---|---|---|---|
| 2016/0173862 | A1* | 6/2016 | Huang | G09G 3/2003<br>348/51 |
| 2018/0075813 | A1* | 3/2018 | Zhang | G09G 3/36 |
| 2018/0180941 | A1* | 6/2018 | Zhang | G02F 1/133602 |
| 2018/0368220 | A1* | 12/2018 | Shuai | G09G 3/36 |
| 2021/0233478 | A1* | 7/2021 | Sun | G09G 3/36 |

FOREIGN PATENT DOCUMENTS

| | | | |
|---|---|---|---|
| CN | 201541314 | U | 8/2010 |
| CN | 103606352 | A | 2/2014 |
| CN | 108364614 | A | 8/2018 |
| CN | 108538258 | A | 9/2018 |
| CN | 108766366 | A | 11/2018 |
| TW | 594264 | B | 6/2004 |

* cited by examiner

METHOD OF PREVENTING BACKLIGHT MODULE FROM OVERHEATING AND DISPLAY DEVICE

FIELD OF INVENTION

The present disclosure relates to the field of display technologies, and more particularly, to a method of preventing a backlight module from overheating and a display device.

BACKGROUND OF INVENTION

At present, with popularity of liquid crystal display panels, requirements for display quality are getting higher. Since mini light-emitting diode (mini-LED) backlight modules have high brightness, high contrasts, ultra-high resolutions, and ultra-high color saturation, mini-LED backlight techniques are gradually becoming a mainstream.

Technical problem: in order to pursue high contrasts, backlight modules are usually set to have a variety of brightness working modes. For example, a greatest brightness ranges from about 500 nits to 1000 nits under normal use. However, in some bright and dark pictures, it is necessary to increase a brightness of a bright part to reflect an effect of ultra-high contrasts, thereby realizing a display effect of dazzling skills or sense of shock. Thus, in this situation, the brightness of the bright part can range from 4000 nits to 10000 nits. However, since light-emitting diodes heat up severely under the 4000-nit brightness, a temperature of entire backlight module will rise sharply, and in the case of heat accumulation, it will damage the backlight modules and even cause danger.

In summary, current backlight modules are prone to overheating under high-brightness conditions. Therefore, it is necessary to provide a method of preventing a backlight module from overheating and a display device to improve the defect.

SUMMARY OF INVENTION

An embodiment of the present disclosure provides a method of preventing a backlight module from overheating and a display device to solve a problem of current backlight modules being prone to overheating under high-brightness conditions.

To solve the above problem, an embodiment of the present disclosure provides following technical solutions.

The present disclosure provides a method of preventing a backlight module from overheating, which includes following steps:

- obtaining a current driving current of each backlight partition in the backlight module;
- determining whether a current brightness of each backlight partition exceeds a default reference brightness according to the current driving current of each backlight partition; and
- adjusting a pulse width modulation (PWM) duty cycle and a tap position of the current driving current corresponding to one backlight partition step by step when the current brightness of the backlight partition exceeds the default reference brightness in each backlight partition to adjust the current brightness to the default reference brightness and to prevent an overheated backlight module caused by a long-time high-brightness operation.

According to an embodiment of the present disclosure, before obtaining the current driving current of each backlight partition in the backlight module, the method further includes following steps:

- arranging a plurality of driving current tap positions and a plurality of PWM switching duty cycles corresponding to the driving current tap positions by one to one; and
- recording a default reference current and a reference duty cycle.

According to an embodiment of the present disclosure, the default reference current is a half of a peak current, and the reference duty cycle is 100%.

According to an embodiment of the present disclosure, the driving current tap positions include at least two tap positions, a driving current of one of the at least two tap positions is a half of the peak current, and a driving current of another one of the at least two tap positions is equal to the peak current.

According to an embodiment of the present disclosure, the driving current tap positions include four tap positions, a current of a first tap position is a quarter of the peak current, a current of a second tap position is a half of the peak current, a current of a third tap position is three quarters of the peak current, and a current of a fourth tap position is equal to the peak current.

According to an embodiment of the present disclosure, one PWM switching duty cycle corresponding to the fourth tap position is 75%, another PWM switching duty cycle corresponding to the third tap position is 67%, and yet another PWM switching duty cycle corresponding to the second tap position is 38%.

According to an embodiment of the present disclosure, steps of determining whether the current brightness of each backlight partition exceeds the default reference brightness according to the current driving current of each backlight partition include:

- comparing the current driving current to the default reference current; and
- if the current driving current is greater than the default reference current, judging the current brightness of the backlight partition exceeds the default reference brightness, and if not, judging the current brightness of the backlight partition does not exceed the default reference brightness.

According to an embodiment of the present disclosure, steps of adjusting the PWM duty cycle and the tap position of the current driving current step by step to adjust the current brightness to the default reference brightness include:

- determining the tap position of the current driving current and one PWM switching duty cycle corresponding to a pulse width modulation according to the current driving current and the PWM duty cycle of the backlight partition;
- gradually reducing the PWM duty cycle and maintaining the tap position of the current driving current unchanged;
- when the PWM duty cycle is reduced to the PWM switching duty cycle correspondingly, lowering the tap position of the current driving current and adjusting the PWM duty cycle to 100%;
- comparing the current driving current after adjustment to the default reference current; and
- if the current driving current after adjustment is greater than the default reference current, repeating above steps until the current driving current after adjustment is less than or equal to the default reference current, and if not, maintaining the tap position of the current driving current and the PWM duty cycle unchanged.

According to an embodiment of the present disclosure, the current brightness is adjusted to the default reference brightness in a default adjustment time, and the default adjustment time is less than or equal to 90 seconds.

According to an embodiment of the present disclosure, before adjusting the PWM duty cycle and the tap position of the current driving current step by step, the tap position of the current driving current and the PWM duty cycle of the backlight partition remain unchanged for a predetermined time, and then adjust the PWM duty cycle and the tap position of the current driving current step by step.

An embodiment of the present disclosure further provides a display device, which includes a display panel, a backlight module disposed on a back side of the display panel, and a timing controller, the backlight module is divided into a plurality of backlight partitions that are independently controlled, and the timing controller includes:

a detection unit configured to obtain a current driving current of each backlight partition;

a judging unit configured to determine whether a current brightness of each backlight partition exceeds a default reference brightness according to the current driving current of each backlight partition; and an adjusting unit configured to adjust a pulse width modulation (PWM) duty cycle and a tap position of the current driving current corresponding to one backlight partition step by step until the current brightness is adjusted to the default reference brightness when the current brightness of the backlight partition exceeds the default reference brightness.

According to an embodiment of the present disclosure, the timing controller further includes:

an arrangement unit configured to arrange a plurality of driving current tap positions and a plurality of PWM switching duty cycles corresponding to the driving current tap positions by one to one; and a recording unit configured to record a default reference current and a reference duty cycle.

According to an embodiment of the present disclosure, the default reference current is a half of a peak current, and the reference duty cycle is 100%.

According to an embodiment of the present disclosure, the driving current tap positions include at least two tap positions, a driving current of one of the at least two tap positions is a half of the peak current, and a driving current of another one of the at least two tap positions is equal to the peak current.

According to an embodiment of the present disclosure, the driving current tap positions include four tap positions, a current of a first tap position is a quarter of the peak current, a current of a second tap position is a half of the peak current, a current of a third tap position is three quarters of the peak current, and a current of a fourth tap position is equal to the peak current.

According to an embodiment of the present disclosure, one PWM switching duty cycle corresponding to the fourth tap position is 75%, another PWM switching duty cycle corresponding to the third tap position is 67%, and yet another PWM switching duty cycle corresponding to the second tap position is 38%.

According to an embodiment of the present disclosure, the judging unit includes:

a first comparing subunit configured to compare the current driving current to the default reference current; and a judging subunit configured to judge the current brightness of the backlight partition exceeds the default reference brightness if the current driving current is greater than the default reference current, and if not, judge the current brightness of the backlight partition does not exceed the default reference brightness.

According to an embodiment of the present disclosure, the adjusting unit includes:

a determining subunit configured to determine the tap position of the current driving current and one PWM switching duty cycle corresponding to a pulse width modulation according to the current driving current and the PWM duty cycle of the backlight partition;

a first adjusting subunit configured to gradually reduce the PWM duty cycle and maintain the tap position of the current driving current unchanged;

a second adjusting subunit configured to lower the tap position of the current driving current and adjust the PWM duty cycle to 100% when the PWM duty cycle is reduced to the PWM switching duty cycle correspondingly; and a second comparing subunit configured to compare the current driving current after adjustment to the default reference current, if the current driving current after adjustment is greater than the default reference current, repeat above steps until the current driving current after adjustment is less than or equal to the default reference current, and if not, maintain the tap position of the current driving current and the PWM duty cycle unchanged.

Beneficial effect: beneficial effects of the embodiments of the present disclosure: the method of preventing the backlight module from overheating and the display device are provided. The method includes following steps: obtaining the current driving current of each backlight partition in the backlight module; determining whether the current brightness of each backlight partition exceeds the default reference brightness according to the current driving current of each backlight partition; and adjusting the PWM duty cycle and the tap position of the current driving current corresponding to the backlight partition step by step when the current brightness of the backlight partition exceeds the default reference brightness in each backlight partition to adjust the current brightness to the default reference brightness and therefore to prevent the backlight module from overheating, which is caused by a long-time high-brightness operation, thereby solving the problem of the backlight module being prone to overheating under high-brightness conditions.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION OF PREFERRED EMBODIMENTS

Figure 1:
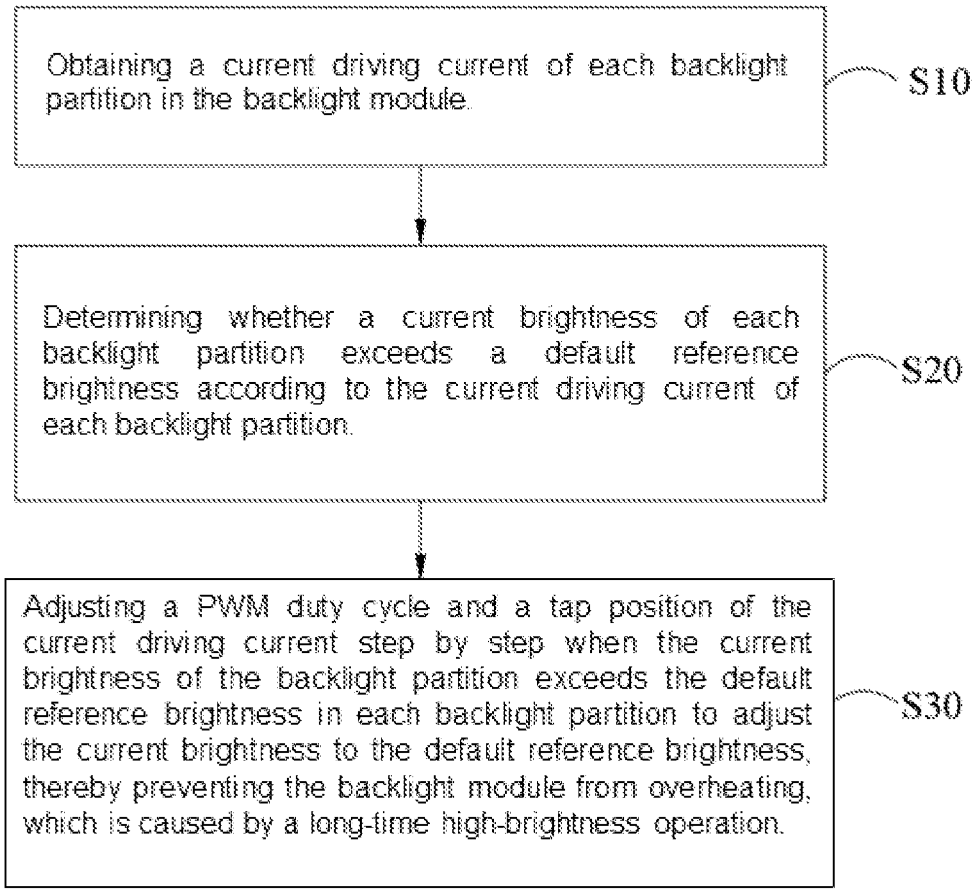
FIG. 1 is a flowchart of a method of preventing a backlight module from overheating according to an embodiment of the present disclosure.

The specific embodiments described with reference to the attached drawings are all exemplary and are intended to illustrate and interpret the present disclosure. In the description of the present disclosure, it should be understood that terms such as "upper", "lower", "front", "rear", "left", "right", "inside", "outside", "side", as well as derivative thereof should be construed to refer to the orientation as described or as shown in the drawings under discussion. Therefore, the directional terms used are to illustrate and understand the present disclosure, not to limit the present disclosure. The identical or similar reference numerals constantly denote the identical or similar elements or elements having the identical or similar functions in the drawings.

The present disclosure will be further explained below in conjunction with the drawings and specific embodiments.

Figure 2:
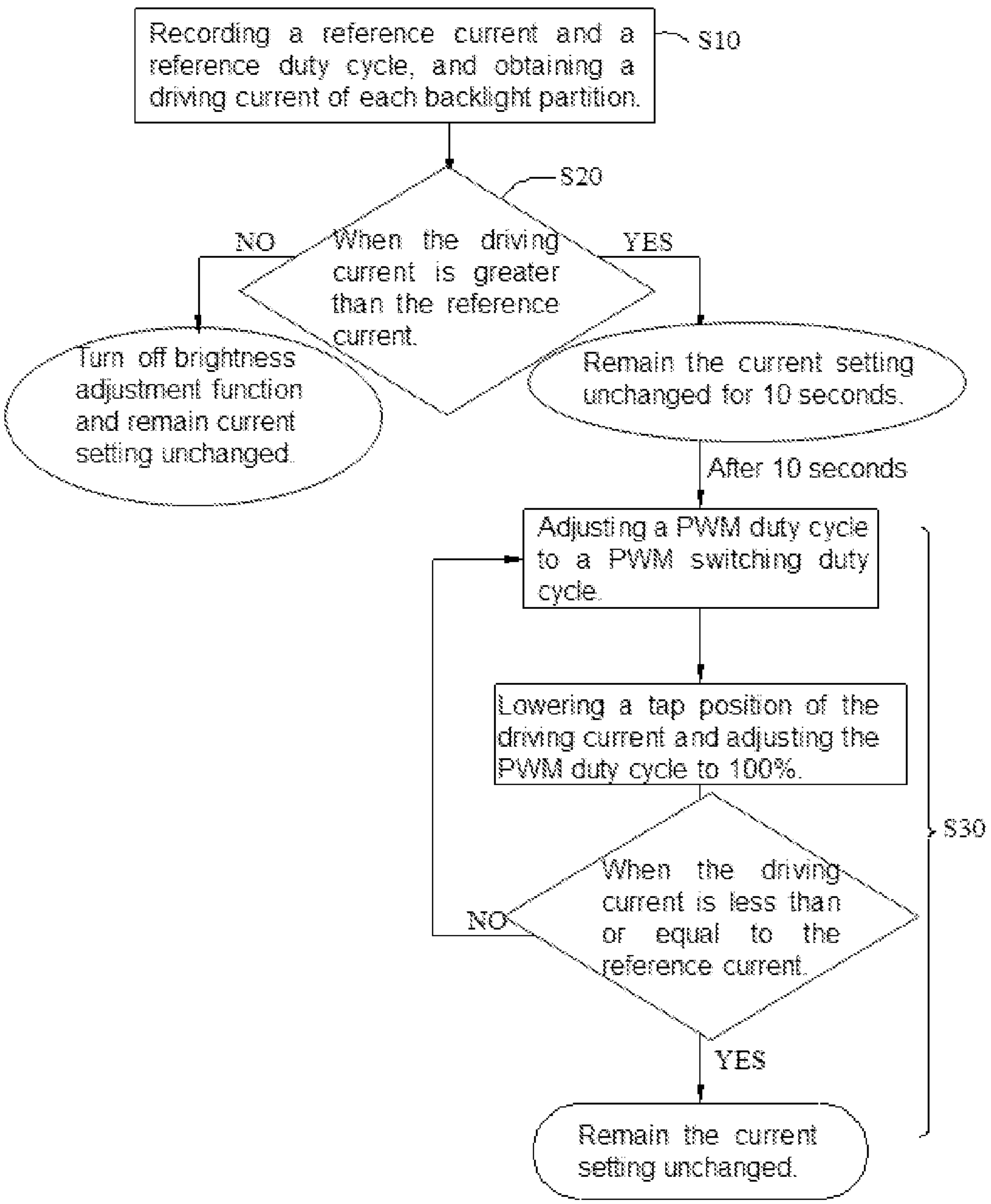
FIG. 2 is a detailed flowchart of the method of preventing the backlight module from overheating according to an embodiment of the present disclosure.

An embodiment of the present disclosure provides a method of preventing a backlight module from overheating. Referring to FIGS. 1 and 2, FIG. 1 is a flowchart of a method of preventing a backlight module from overheating according to an embodiment of the present disclosure, and FIG. 2 is a detailed flowchart of the method of preventing the backlight module from overheating according to an embodiment of the present disclosure. The method includes following steps.

Step S10: obtaining a current driving current of each backlight partition in the backlight module.

In this embodiment, the backlight module is a mini light-emitting diode backlight module, which includes a plurality of backlight partitions. Each backlight partition includes a plurality of mini light-emitting diodes distributed in an array, and a brightness of each backlight partition can be independently controlled by a drive chip. When working, the brightness of each backlight partition can be adjusted according to grayscales of a picture to be displayed of a current frame in a display panel to realize local dimming functions, thereby achieving energy saving and image quality enhancement effects. A type of the backlight module can be selected according to needs in practical applications, it is not limited to the mini light-emitting diode backlight module mentioned above, and may also be a micro light-emitting diode backlight module or a conventional direct type backlight module.

The brightness of each backlight partition is proportional to a driving current. The greater the driving current is, the higher it is in the brightness of each backlight partition. The brightness of each backlight partition is also proportional to a pulse width modulation (PWM) duty cycle. The greater the PWM duty cycle is, the higher it is in the brightness of each backlight partition. A final brightness of each backlight partition is determined by the driving current in conjunction with the PWM duty cycle.

In this embodiment, the current driving current and a current PWM duty cycle of each backlight partition can be obtained by a detection unit disposed in a timing controller. The current PWM duty cycle of each backlight partition is determined by a grayscale value of the picture to be displayed of the current frame in the display panel. The timing controller can transmit grayscale data signals of the picture to be displayed of the current frame to a constant current source via interfaces such as SPI, LVDS, or mini-LVDS, and the constant current source converts the grayscale data signals of the picture to be displayed of the current frame into the PWM duty cycle. Therefore, the brightness of each backlight partition in the backlight module can be controlled by adjusting the PWM duty cycle.

In this embodiment of the present disclosure, before obtaining the driving current corresponding to each backlight partition in the backlight module, the method further includes following steps: arranging a plurality of driving current tap positions and a plurality of PWM switching duty cycles corresponding to the driving current tap positions by one to one; and recording a default reference current and a reference duty cycle.

In order to realize a display effect of high contrasts, a plurality of brightness partitions are required to be set in the backlight module, and a plurality of driving current tap positions corresponding to the brightness partitions by one to one are required to be set in corresponding driving currents. The driving current tap positions include at least two tap positions, a driving current of one of the at least two tap positions is a half of a peak current, and a driving current of another one of the at least two tap positions is equal to the peak current. The timing controller can drive current tap position adjusting signals to the constant current source to control the constant current source to adjust the driving current tap positions according to the current tap position adjusting signals, thereby adjusting an amount of the driving current and then changing the brightness of the backlight module.

Specifically, in this embodiment, the driving current tap positions of the constant current source are divided into four tap positions. A current of a first tap position of the constant current source is a quarter of the peak current, a current of a second tap position of the constant current source is a half of the peak current, a current of a third tap position of the constant current source is three quarters of the peak current, and a current of a fourth tap position of the constant current source is equal to the peak current. When one driving current tap position of the constant current source corresponding to one backlight partition is adjusted to the fourth tap position and the PWM duty cycle is 100%, the brightness of the backlight partition reaches a peak brightness, and the peak brightness is 4000 nits. Since the driving current tap position of the constant current source is divided into four tap positions, when adjusting one percent point duty cycle, a reduced value of the brightness is small, so brightness switching of the backlight partition is smoother, and users cannot perceive obvious light and dark changes with naked eyes. In practical applications, a number of the driving current tap positions of the constant current source may be varied according to needs, which is not limited to the four tap positions mentioned above, and may be two, three, five, or more tap positions.

The fourth tap position corresponds to a 75% PWM switching duty cycle, when a tap position of the driving current is the fourth tap position and the PWM duty cycle is reduced to 75%, the tap position of the driving current is lowered to the third tap position. The third tap position corresponds to a 67% PWM switching duty cycle, when the tap position of the driving current is the third tap position and the PWM duty cycle is adjusted to 67%, the tap position of the driving current is lowered to the second tap position. The second tap position corresponds to a 38% PWM switching duty cycle, when the tap position of the driving current is the second tap position and the PWM duty cycle is reduced to 38%, the tap position of the driving current is lowered to the first tap position. In this embodiment, the default reference current is a half of the peak current, the reference duty cycle is 100%, a reference brightness is a half of the peak brightness, and the reference brightness is 2000 nits. When the brightness of the backlight partition is greater than 2000 nits, the backlight partition can be determined as a high-brightness area. In practical applications, amounts of the default reference current and the reference duty cycle may be determined according to needs, which are not limited to the default reference current being a half of the peak current and the reference duty cycle being 100%. The default reference current may be one-third or two-fifths of the peak current, and the reference duty cycle may be 90% or 80%. A value of the reference brightness may also be determined according to needs, which is not limited to 2000 nits mentioned above, and may also be 500 nits, 1000 nits, or 1500 nits as long as it ranges from 500 nits to 2000 nits.

Step S20: determining whether a current brightness of each backlight partition exceeds a default reference brightness according to the current driving current of each backlight partition.

In this embodiment of the present disclosure, steps of determining whether the current brightness of each backlight partition exceeds the default reference brightness according to the current driving current of each backlight partition include: comparing the current driving current to the default reference current; and if the current driving current is greater than the default reference current, judging the current brightness of the backlight partition exceeds the default reference brightness, and if the current driving current is less than or equal to the default reference current, judging the current brightness of the backlight partition does not exceed the default reference brightness.

The brightness of each backlight partition is determined by the driving current in conjunction with the PWM duty cycle, and the brightness of each backlight partition is proportional to both the driving current and the PWM duty cycle. When the driving current is greater than the default reference current, a brightness generated by the driving current can be determined to be greater than a brightness generated by the default reference current without comparing PWM duty cycles thereof. Therefore, it only needs to obtain the current driving current of each backlight partition to determine whether the brightness of each backlight partition exceeds the default reference brightness, and there is no need to dispose a brightness monitoring sensor to monitor a brightness of light emitted from each backlight partition of the backlight module to realize brightness adjustment of each backlight partition of the backlight module, thereby reducing a difficulty of brightness control in the backlight module and simplifying a structure of a display device.

In this embodiment, the default reference current is a half of the peak current, and the reference duty cycle is 100%. The peak current is defined as 1, when a tap position of the current driving current of one backlight partition is the third tap position, the current driving current is 0.75 I, which is greater than 0.5 I of the default reference current, and the current brightness of the backlight partition can be determined to exceed the default reference brightness. Therefore, the backlight partition may have an overheated problem, and brightness adjustment is needed for the backlight partition. If the current driving current is less than or equal to the default reference current, the current brightness of the backlight partition is determined to not exceed the default reference brightness. Therefore, the backlight partition may have no overheated problem, and there is no need for brightness adjustment.

In this embodiment, after determining whether the current brightness of each backlight partition exceeds the default reference brightness, if the current brightness of each backlight partition exceeds the default reference brightness, a hint of whether to adjust the brightness may be given for users to choose, and the users may decide whether to adjust the brightness of the backlight partition, which exceeds the default reference brightness.

Step S30: adjusting the PWM duty cycle and the tap position of the current driving current step by step when the current brightness of the backlight partition exceeds the default reference brightness in each backlight partition to adjust the current brightness to the default reference brightness, thereby preventing the backlight module from overheating, which is caused by a long-time high-brightness operation.

In this embodiment, if the hint of whether to adjust the brightness is given for the users to choose when the current brightness of the backlight partition exceeds the default reference brightness, then a decision given by the users is necessary to be acquired before adjusting the brightness. If the users choose yes, then adjust the PWM duty cycle and the tap position of the current driving current step by step to adjust the current brightness to the default reference brightness, and if the users choose no, then there is no brightness adjustment for the backlight partition, and a current setting remains unchanged, that is, the tap position of the current driving current and the PWM duty cycle of the backlight partition remain unchanged, to realize a display effect of higher contrasts.

In this embodiment, steps of adjusting the PWM duty cycle and the tap position of the current driving current step by step to adjust the current brightness to the default reference brightness include: determining the tap position of the current driving current and one PWM switching duty cycle corresponding to a pulse width modulation according to the current driving current and the PWM duty cycle of the backlight partition; gradually reducing the PWM duty cycle and maintaining the tap position of the current driving current unchanged; when the PWM duty cycle is reduced to the PWM switching duty cycle correspondingly, lowering the tap position of the current driving current and adjusting the PWM duty cycle to 100%; comparing the current driving current after adjustment to the default reference current; and if the current driving current after adjustment is greater than the default reference current, repeating above steps until the current driving current after adjustment is less than or equal to the default reference current, and if not, which indicates that the brightness of the backlight partition is already adjusted to the default reference brightness, maintaining the current setting unchanged, that is, maintaining the tap position of the current driving current and the PWM duty cycle unchanged.

In the step of gradually reducing the PWM duty cycle and maintaining the tap position of the current driving current unchanged, it can be set to adjust the PWM duty cycle in a fixed duty cycle p within a unit of time t. The smaller the fixed duty cycle p is within the unit of time t for adjustment, the less it is in reducing a brightness value within the unit of time. Therefore, the brightness of the backlight partition can be slowly reduced, and it is uneasy for the users to perceive light and dark changes with naked eyes. The larger the fixed duty cycle p is within the unit of time t for adjustment, the more it is in reducing the brightness value within the unit of time, and it is easy for the users to perceive the light and dark changes, thereby affecting a display effect of the display panel. For example, when t=1 ms and p=1%, it means that 1% duty cycle is reduced within 1 ms. In practical applications, the unit of time t and the fixed duty cycle p for adjustment can be determined according to needs, which are not limited to t=1 ms and p=1% mentioned above, and they may also be t=1 ms and p=0.5% or t=1 ms and p=2%.

It should be noted that the fixed duty cycle p within the unit of time t for adjustment may not be too large or too small, and it is necessary to adjust the brightness of the backlight partition to the default reference brightness within a default adjustment time. If the brightness of the backlight partition is not adjusted to the default reference brightness within the default adjustment time, the backlight partition may have a risk of overheating. In this embodiment, the adjustment time is set to be 90 seconds. In practical applications, the adjustment time may be determined according to needs, which is not limited to seconds mentioned above, and it may also be 80 seconds, 70 seconds, or seconds.

In this embodiment, assuming that the current driving current of the backlight partition is the peak current and the PWM duty cycle is 100%, and then steps of brightness adjustment for the backlight partition are as follows: determining the tap position of the current driving current is the fourth tap position and the PWM switching duty cycle is 75% according to the current driving current and the PWM duty cycle of the backlight partition; gradually reducing the PWM duty cycle and maintaining the tap position of the current driving current unchanged, and when the PWM duty cycle is reduced to 75%, adjusting the tap position of the current driving current to the third tap position and adjusting the PWM duty cycle to 100%; comparing the current driving current to the default reference current, wherein, the current driving current is 0.75 I and is greater than 0.5 I of the default reference current, and it can be determined that the brightness of the backlight partition at this time is not reduced to the default reference brightness; determining the PWM switching duty cycle of the backlight partition now is 67%, continuing to gradually adjust the PWM duty cycle until the PWM duty cycle being reduced to 67%, and maintaining the third tap position of the current driving current unchanged; lowering the tap position of the current driving current to the second tap position, and adjusting the PWM duty cycle to 100%; comparing the current driving current to the default reference current, wherein, the current driving current is 0.51 and is equal to 0.51 of the default reference current, and it can be determined that the brightness of the backlight partition at this time is reduced to the default reference brightness; and finishing the brightness adjustment, and maintaining the tap position of the current driving current and the PWM duty cycle of the backlight partition unchanged.

In other embodiments, the tap position of the driving current may also be defined as two tap positions. Wherein, a current of a first tap position is a half of the peak current, a current of a second tap position is the peak current, and a PWM switching duty cycle corresponding to the second tap position is 50%. When the current driving current of the backlight partition is the peak current and the PWM duty cycle is 100%, steps of the brightness adjustment for the backlight partition are as follows: determining the tap position of the current driving current is the second tap position and the PWM switching duty cycle is 50% according to the current driving current and the PWM duty cycle of the backlight partition; gradually reducing the PWM duty cycle and maintaining the second tap position of the current driving current unchanged, and when the PWM duty cycle is reduced to 50%, adjusting the tap position of the current driving current to the first tap position and adjusting the PWM duty cycle to 100%; comparing the current driving current to the default reference current, wherein, the current driving current is 0.51 and is equal to 0.51 of the default reference current, and it can be determined that the brightness of the backlight partition at this time is reduced to the default reference brightness; and finishing the brightness adjustment, and maintaining the tap position of the current driving current and the PWM duty cycle of the backlight partition unchanged.

Before adjusting the PWM duty cycle and the tap position of the current driving current step by step, the tap position of the current driving current and the PWM duty cycle of the backlight partition remain unchanged for a predetermined time, and then adjust the PWM duty cycle and the current driving current step by step. Before performing the brightness adjustment on the backlight partition, maintain the tap position of the current driving current and the PWM duty cycle of the backlight partition unchanged for the predetermined time, that is, maintain the current brightness of the backlight partition unchanged for the predetermined time, so that it can ensure a current displaying picture of the display panel to have a display effect of ultra-high contrasts.

In this embodiment, before performing the brightness adjustment on the backlight partition, the predetermined time for maintaining the tap position of the current driving current and the PWM duty cycle of the backlight partition unchanged is 10 seconds. In practical applications, the predetermined time may be determined according to needs, which is not limited to 10 seconds mentioned above, and it may also be 5 seconds, 8 seconds, 15 seconds, or 20 seconds.

Figure 3:
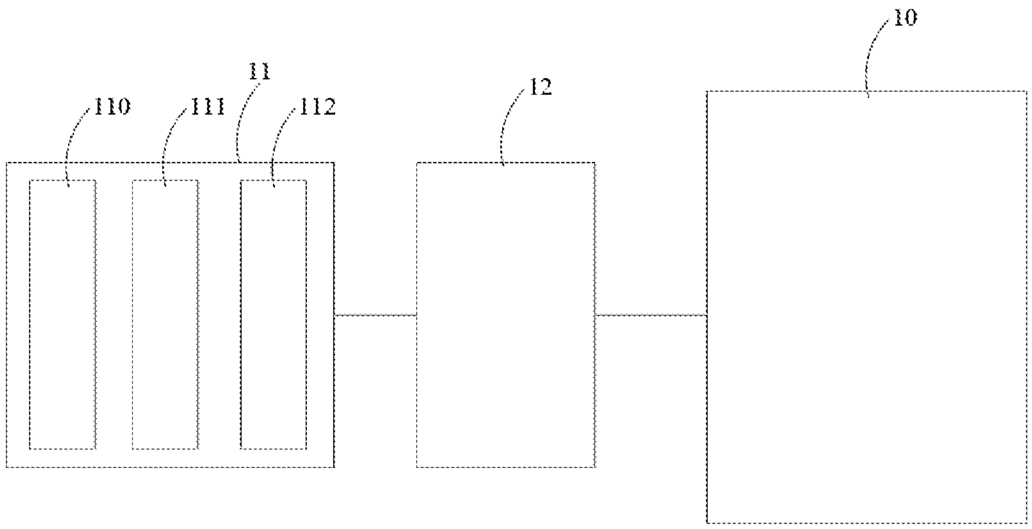
FIG. 3 is a schematic structural diagram of a display device according to an embodiment of the present disclosure.

An embodiment of the present disclosure further provides a display device. Referring to FIG. 3, FIG. 3 is a schematic structural diagram of the display device according to the embodiment of the present disclosure. The display device includes the display panel (not shown in the figures), the backlight module 10 disposed on a back side of the display panel, the timing controller 11, and the constant current source 12.

The display panel is a liquid crystal display panel, the backlight module 10 is a mini light-emitting diode backlight module, which is divided into a plurality of backlight partitions. Each backlight partition includes a plurality of mini light-emitting diodes distributed in an array, and the brightness of each backlight partition can be independently controlled by the drive chip. When working, the brightness of each backlight partition can be adjusted according to the grayscales of the picture to be displayed of the current frame in the display panel to realize local dimming functions, thereby achieving energy saving and image quality enhancement effects. The type of the backlight module 10 can be selected according to needs in practical applications, it is not limited to the mini light-emitting diode backlight module mentioned above, and may also be a micro light-emitting diode backlight module or a conventional direct type backlight module.

Referring to FIG. 3, in this embodiment, the timing controller 11 includes a detection unit 110, a judging unit 111, and an adjusting unit 112. Wherein, the detection unit 110 is configured to obtain the current driving current and the PWM duty cycle of each backlight partition.

The judging unit 111 is configured to determine whether the current brightness of each backlight partition exceeds the default reference brightness according to the current driving current of each backlight partition. In other embodiments, when the current brightness of each backlight partition exceeds the default reference brightness, the judging unit 111 may also give the hint of whether to adjust the brightness for users to choose.

The adjusting unit 112 is configured to adjust the PWM duty cycle and the tap position of the current driving current step by step to adjust the brightness of the backlight partition to the default reference brightness when the brightness of the backlight partition exceeds the default reference brightness. If the judging unit 111 gives the hint of whether to adjust the brightness for the users to choose when the current brightness of the backlight partition exceeds the default reference brightness, then the adjusting unit 112 needs to acquire the decision given by the users before performing the brightness adjustment on the backlight partition. If the users choose yes, then the adjusting unit 112 adjusts the PWM duty cycle and the tap position of the current driving current step by step according to the choice of the users to adjust the brightness of the backlight partition to the default reference brightness, and if the brightness of the backlight partition is less than or equal to the default reference brightness or the users choose no, then there is no brightness adjustment for the backlight partition.

The timing controller 11 can transmit grayscale data signals of the picture to be displayed of the current frame to the constant current source 12 via the interfaces such as SPI, LVDS, or mini-LVDS, and the constant current source 12 converts the grayscale data signals of the picture to be displayed of the current frame into the PWM duty cycle. Therefore, the brightness of each backlight partition can be controlled by adjusting the PWM duty cycle corresponding to each backlight partition in the backlight module. The timing controller can also drive the current tap position adjusting signals to the constant current source via the interfaces such as SPI, LVDS, or mini-LVDS to control the constant current source to adjust the driving current tap positions according to the current tap position adjusting signals. Therefore, the brightness of each backlight partition can be controlled by adjusting the amount of the driving current corresponding to each backlight partition in the backlight module.

The timing controller 11 also includes an arrangement unit and a recording unit (not shown in the figures). Wherein, the arrangement unit is configured to arrange the plurality of driving current tap positions and the plurality of PWM switching duty cycles corresponding to the driving current tap positions by one to one, and the recording unit is configured to record the default reference current and the reference duty cycle.

In this embodiment, the driving current tap positions of the constant current source are divided into four tap positions. The current of the first tap position of the constant current source is a quarter of the peak current, the current of the second tap position of the constant current source is a half of the peak current, the current of the third tap position of the constant current source is three quarters of the peak current, and the current of the fourth tap position of the constant current source is equal to the peak current. When the driving current tap position of the constant current source corresponding to the backlight partition is adjusted to the fourth tap position and the PWM duty cycle is 100%, the brightness of the backlight partition reaches the peak brightness, and the peak brightness is 4000 nits. Since the driving current tap position of the constant current source is divided into four tap positions, when adjusting one percent point duty cycle, the reduced value of the brightness is small, so the brightness switching of the backlight partition is smoother, and the users cannot perceive obvious light and dark changes with naked eyes. In practical applications, the number of the driving current tap positions of the constant current source may be varied according to needs, which is not limited to the four tap positions mentioned above, and may be two, three, five, or more tap positions.

The fourth tap position corresponds to the 75% PWM switching duty cycle, when the tap position of the driving current is the fourth tap position and the PWM duty cycle is reduced to 75%, the tap position of the driving current is lowered to the third tap position. The third tap position corresponds to the 67% PWM switching duty cycle, when the tap position of the driving current is the third tap position and the PWM duty cycle is adjusted to 67%, the tap position of the driving current is lowered to the second tap position. The second tap position corresponds to the 38% PWM switching duty cycle, when the tap position of the driving current is the second tap position and the PWM duty cycle is reduced to 38%, the tap position of the driving current is lowered to the first tap position.

In this embodiment, the default reference current is a half of the peak current, the reference duty cycle is 100%, the reference brightness is a half of the peak brightness, and the reference brightness is 2000 nits. When the brightness of the backlight partition is greater than 2000 nits, the backlight partition can be determined as the high-brightness area. In practical applications, the amounts of the default reference current and the reference duty cycle may be determined according to needs, which are not limited to the default reference current being a half of the peak current and the reference duty cycle being 100%. The default reference current may be one-third or two-fifths of the peak current, and the reference duty cycle may be 90% or 80%. The value of the reference brightness may also be determined according to needs, which is not limited to 2000 nits mentioned above, and may also be 500 nits, 1000 nits, or 1500 nits as long as it ranges from 500 nits to 2000 nits.

The judging unit 111 includes a first comparing subunit and a judging subunit. Wherein, the first comparing subunit is configured to compare the current driving current to the default reference current. The judging subunit is configured to judge the current brightness of the backlight partition exceeds the default reference brightness if the current driving current is greater than the default reference current, and if not, judge the current brightness of the backlight partition does not exceed the default reference brightness.

In this embodiment, the default reference current is a half of the peak current, and the reference duty cycle is 100%. The peak current is defined as 1, when the tap position of the current driving current of the backlight partition is the third tap position, the current driving current is 0.75 I, which is greater than 0.5 I of the default reference current, and the current brightness of the backlight partition can be determined to exceed the default reference brightness. Therefore, the backlight partition may have the overheated problem, and the hint of whether to perform the brightness adjustment is needed to be given for the users to choose. If the current driving current is less than or equal to the default reference current, the current brightness of the backlight partition is determined to not exceed the default reference brightness. Therefore, the backlight partition may have no overheated problem, and there is no need for brightness adjustment.

The adjusting unit 112 includes a determining subunit, a first adjusting subunit, a second adjusting subunit, and a second comparing subunit. Wherein, the determining subunit is configured to determine the tap position of the current driving current and the PWM switching duty cycle corresponding to the pulse width modulation according to the current driving current and the PWM duty cycle of the backlight partition. The first adjusting subunit is configured to gradually reduce the PWM duty cycle and maintain the tap position of the current driving current unchanged. The second adjusting subunit is configured to lower the tap position of the current driving current and adjust the PWM duty cycle to 100% when the PWM duty cycle is reduced to the PWM switching duty cycle correspondingly. The second comparing subunit is configured to compare the current driving current after adjustment to the default reference current, if the current driving current after adjustment is greater than the default reference current, repeat the above steps until the current driving current after adjustment is less than or equal to the default reference current, and if not, maintain the tap position of the current driving current and the PWM duty cycle unchanged.

The embodiments of the present disclosure provide the method of preventing the backlight module from overheating and the display device. The method includes the following steps: obtaining the current driving current of each backlight partition in the backlight module; determining whether the current brightness of each backlight partition exceeds the default reference brightness according to the current driving current of each backlight partition; and adjusting the PWM duty cycle and the tap position of the current driving current step by step when the brightness of the backlight partition exceeds the default reference brightness in each backlight partition to adjust the brightness of the backlight partition to the default reference brightness. Therefore, the brightness of the backlight partition can be adjusted timely, and the backlight module can be prevented from overheating, which is caused by the long-time high-brightness operation of the backlight partitions, thereby solving the problem of the backlight module being prone to overheating under high-brightness conditions.

The present disclosure has been described with preferred embodiments thereof. The preferred embodiments are not intended to limit the present disclosure, and it is understood that many changes and modifications to the described embodiments can be carried out without departing from the scope and the spirit of the disclosure that is intended to be limited only by the appended claims.

What is claimed is:

1. A method of preventing a backlight module from overheating, comprising following steps:

obtaining a current driving current of each backlight partition in the backlight module;

determining whether a current brightness of each backlight partition exceeds a default reference brightness according to the current driving current of each backlight partition; and adjusting a pulse width modulation (PWM) duty cycle and a tap position of the current driving current corresponding to one backlight partition step by step when the current brightness of the backlight partition exceeds the default reference brightness in each backlight partition to adjust the current brightness to the default reference brightness and to prevent an overheated backlight module caused by a long-time high-brightness operation; wherein before obtaining the current driving current of each backlight partition in the backlight module, the method further comprises:

arranging a plurality of driving current tap positions and a plurality of PWM switching duty cycles corresponding to the driving current tap positions by one to one; and recording a default reference current and a reference duty cycle.

2. The method of preventing the backlight module from overheating according to claim 1, wherein the default reference current is a half of a peak current, and the reference duty cycle is 100%.

3. The method of preventing the backlight module from overheating according to claim 2, wherein the driving current tap positions comprise at least two tap positions, a driving current of one of the at least two tap positions is a half of the peak current, and a driving current of another one of the at least two tap positions is equal to the peak current.

4. The method of preventing the backlight module from overheating according to claim 3, wherein the driving current tap positions comprise four tap positions, a current of a first tap position is a quarter of the peak current, a current of a second tap position is a half of the peak current, a current of a third tap position is three quarters of the peak current, and a current of a fourth tap position is equal to the peak current.

5. The method of preventing the backlight module from overheating according to claim 4, wherein one PWM switching duty cycle corresponding to the fourth tap position is 75%, another PWM switching duty cycle corresponding to the third tap position is 67%, and yet another PWM switching duty cycle corresponding to the second tap position is 38%.

6. The method of preventing the backlight module from overheating according to claim 1, wherein steps of determining whether the current brightness of each backlight partition exceeds the default reference brightness according to the current driving current of each backlight partition comprise:

comparing the current driving current to the default reference current; and if the current driving current is greater than the default reference current, judging the current brightness of the backlight partition exceeds the default reference brightness, and if not, judging the current brightness of the backlight partition does not exceed the default reference brightness.

7. The method of preventing the backlight module from overheating according to claim 1, wherein steps of adjusting the PWM duty cycle and the tap position of the current driving current step by step to adjust the current brightness to the default reference brightness comprise:

determining the tap position of the current driving current and one PWM switching duty cycle corresponding to a pulse width modulation according to the current driving current and the PWM duty cycle of the backlight partition;

gradually reducing the PWM duty cycle and maintaining the tap position of the current driving current unchanged;

when the PWM duty cycle is reduced to the PWM switching duty cycle correspondingly, lowering the tap position of the current driving current and adjusting the PWM duty cycle to 100%;

comparing the current driving current after adjustment to the default reference current; and if the current driving current after adjustment is greater than the default reference current, repeating above steps until the current driving current after adjustment is less than or equal to the default reference current, and if not, maintaining the tap position of the current driving current and the PWM duty cycle unchanged.

8. The method of preventing the backlight module from overheating according to claim 7, wherein the current brightness is adjusted to the default reference brightness in a default adjustment time, and the default adjustment time is less than or equal to 90 seconds.

9. The method of preventing the backlight module from overheating according to claim 7, wherein before adjusting the PWM duty cycle and the tap position of the current driving current step by step, the tap position of the current driving current and the PWM duty cycle of the backlight partition remain unchanged for a predetermined time, and then adjust the PWM duty cycle and the tap position of the current driving current step by step.

10. A display device, comprising a display panel, a backlight module disposed on a back side of the display panel, and a timing controller, the backlight module is divided into a plurality of backlight partitions that are independently controlled, and the timing controller comprises:

a detection unit configured to obtain a current driving current of each backlight partition;

a judging unit configured to determine whether a current brightness of each backlight partition exceeds a default reference brightness according to the current driving current of each backlight partition; and an adjusting unit configured to adjust a pulse width modulation (PWM) duty cycle and a tap position of the current driving current corresponding to one backlight partition step by step until the current brightness is adjusted to the default reference brightness when the current brightness of the backlight partition exceeds the default reference brightness; wherein the timing controller further comprises:

an arrangement unit configured to arrange a plurality of driving current tap positions and a plurality of PWM switching duty cycles corresponding to the driving current tap positions by one to one; and a recording unit configured to record a default reference current and a reference duty cycle.

11. The display device according to claim 10, wherein the default reference current is a half of a peak current, and the reference duty cycle is 100%.

12. The display device according to claim 11, wherein the driving current tap positions comprise at least two tap positions, a driving current of one of the at least two tap positions is a half of the peak current, and a driving current of another one of the at least two tap positions is equal to the peak current.

13. The display device according to claim 12, wherein the driving current tap positions comprise four tap positions, a current of a first tap position is a quarter of the peak current, a current of a second tap position is a half of the peak current, a current of a third tap position is three quarters of the peak current, and a current of a fourth tap position is equal to the peak current.

14. The display device according to claim 13, wherein one PWM switching duty cycle corresponding to the fourth tap position is 75%, another PWM switching duty cycle corresponding to the third tap position is 67%, and yet another PWM switching duty cycle corresponding to the second tap position is 38%.

15. The display device according to claim 10, wherein the judging unit comprises:

a first comparing subunit configured to compare the current driving current to the default reference current; and a judging subunit configured to judge the current brightness of the backlight partition exceeds the default reference brightness if the current driving current is greater than the default reference current, and if not, judge the current brightness of the backlight partition does not exceed the default reference brightness.

16. The display device according to claim 15, wherein the adjusting unit comprises:

a determining subunit configured to determine the tap position of the current driving current and one PWM switching duty cycle corresponding to a pulse width modulation according to the current driving current and the PWM duty cycle of the backlight partition;

a first adjusting subunit configured to gradually reduce the PWM duty cycle and maintain the tap position of the current driving current unchanged;

a second adjusting subunit configured to lower the tap position of the current driving current and adjust the PWM duty cycle to 100% when the PWM duty cycle is reduced to the PWM switching duty cycle correspondingly; and a second comparing subunit configured to compare the current driving current after adjustment to the default reference current, if the current driving current after adjustment is greater than the default reference current, repeat above steps until the current driving current after adjustment is less than or equal to the default reference current, and if not, maintain the tap position of the current driving current and the PWM duty cycle unchanged.

* * * * *